United States Patent [19]
Michels et al.

[11] Patent Number: 5,992,079
[45] Date of Patent: *Nov. 30, 1999

[54] WRISTSAVER FISHING ROD HANDLE AND SYSTEM

[76] Inventors: Neil D. Michels; Katherine A. Michels, both of 7460 165$^{th}$ St. East, Prior Lake (Scott County), Minn. 55372-9317

[ * ] Notice: This patent issued on a continued prosecution application filed under 37 CFR 1.53(d), and is subject to the twenty year patent term provisions of 35 U.S.C. 154(a)(2).

[21] Appl. No.: 09/021,962

[22] Filed: Feb. 11, 1998

[51] Int. Cl.$^6$ .................................................. A01K 87/00
[52] U.S. Cl. ................................................. 43/18.1; 43/23
[58] Field of Search ............................... 43/18.1, 23, 25

[56] References Cited

U.S. PATENT DOCUMENTS

| | | | |
|---|---|---|---|
| 72,667 | 12/1867 | Montrose | 43/18.1 |
| D. 246,181 | 10/1977 | Sweeney | D22/23 |
| 252,008 | 1/1882 | Andrews | 43/21.2 |
| D. 300,552 | 4/1989 | Worth | D22/142 |
| D. 301,514 | 6/1989 | Eccles | D22/142 |
| D. 315,944 | 4/1991 | Gibich | D22/142 |
| D. 352,088 | 11/1994 | Dillon | D22/139 |
| 579,277 | 3/1897 | Lord et al. | 43/18.1 |
| 595,134 | 12/1897 | Bastide | 135/74 |
| 809,432 | 1/1906 | Darrschmidt | 43/18.1 |
| 1,266,367 | 5/1918 | Wilson | 5/646 |
| 1,833,787 | 11/1931 | Mauss . | |
| 1,837,623 | 12/1931 | Mansfield . | |
| 2,000,263 | 5/1935 | Teetor | 43/23 |
| 2,293,559 | 8/1942 | Patterson | 43/23 |
| 2,593,885 | 4/1952 | James | 43/19 |
| 2,675,568 | 4/1954 | King | 9/9 |
| 2,839,863 | 6/1958 | Heffel | 43/22 |
| 3,196,572 | 7/1965 | Steinle | 43/22 |
| 3,222,811 | 12/1965 | Henson | 43/18 |
| 3,319,910 | 5/1967 | Collin et al. | 43/18.1 |
| 3,372,509 | 3/1968 | Arsenault | 43/21.2 |
| 3,372,510 | 3/1968 | Arsenault | 43/21.2 |
| 3,727,338 | 4/1973 | Pederson | 43/18 R |
| 3,772,817 | 11/1973 | Bowerfind et al. | 43/22 |
| 4,014,129 | 3/1977 | Capra | 43/23 |
| 4,130,960 | 12/1978 | Fontenot | 43/18 R |
| 4,577,432 | 3/1986 | Brackett et al. | 43/23 |
| 4,651,461 | 3/1987 | Williams | 43/23 |
| 4,654,996 | 4/1987 | Gieselman | 43/23 |
| 4,688,346 | 8/1987 | Collins | 43/22 |
| 4,845,879 | 7/1989 | Urso | 43/18.1 |
| 4,876,980 | 10/1989 | Bell, III | 114/364 |
| 5,127,182 | 7/1992 | Hutchings et al. | 43/25 |
| 5,231,782 | 8/1993 | Testa | 43/18.1 |
| 5,390,438 | 2/1995 | Warren, Jr. | 43/23 |
| 5,461,818 | 10/1995 | Balkom | 43/23 |
| 5,509,228 | 4/1996 | Wright, Jr. | 43/23 |

FOREIGN PATENT DOCUMENTS

| | | | |
|---|---|---|---|
| 77748 | 7/1949 | Czechoslovakia | 43/18.1 |
| 25296 | 3/1952 | Finland | 43/18.1 |
| 538757 | 5/1956 | Italy | 43/18.1 |
| 530610 | 11/1957 | Italy | 43/18.1 |
| 72233 | 6/1950 | Norway | 43/18.1 |
| 131288 | 4/1951 | Sweden | 43/18.1 |
| 179038 | 4/1962 | Sweden | 43/18.1 |
| 14891 | 11/1895 | United Kingdom | 43/18.1 |
| 187372 | 10/1922 | United Kingdom | 43/18.1 |
| 2215967 | 10/1989 | United Kingdom | 43/18.1 |
| 94/010834 | 5/1994 | WIPO | 43/18.1 |

*Primary Examiner*—Michael J. Carone
*Assistant Examiner*—Fredrick T. French, III
*Attorney, Agent, or Firm*—Charles A. Johnson

[57] ABSTRACT

An improved wristsaver fishing rod handle and system having an improved ergonomic handle is described. The system includes an elongated pole having a plurality of spaced-apart downwardly extending line guides disposed along the length, with a distal tip and a proximal handle mounting portion for connecting to the ergonomic handle. The ergonomic handle has a mounting section for coupling to the pole, a first handle portion disposed at an angle to the mounting portion, and a second handle portion mounted at a second predetermined angle to the first handle. A spinning reel mount is associated with the first handle, to position the downwardly extending spinning reel in an operative relationship to the casting hand of a user. A first alternative embodiment describes an adjustment mechanism for adjusting the angle of the first handle portion with respect to the mounting portion. A second alternative embodiment includes a second adjustment mechanism to adjust the angle of the second handle with respect to the first handle.

29 Claims, 5 Drawing Sheets

WRISTSAVER FISHING ROD HANDLE AND SYSTEM

BACKGROUND OF THE INVENTION

1. Field of the Invention

This invention relates generally to fishing apparatus; and, more particularly, to an improved handle and rod mount structure used with spinning reels and rods.

2. State of the Prior Art

Over the years a number of types of fishing rods have been developed to accommodate various fishing styles and bait presentations. These prior art fishing systems are well known and have differing rod requirements. Still-fishing systems characteristically utilized relatively long heavy duty rods with a fixed relationship of the length of the rod to the amount of line used. Trolling systems characteristically utilize relatively short stiff rods in conjunction with heavy duty line and reel combinations. Systems for the presentation of artificial flies and the like primarily utilize the combination of an elongated rod in combination with line that matches the action of the rod. The foregoing types of fishing systems do not usually place undue repeated stress on the hands or wrists of the user during presentation of the various baits employed.

Other types of fishing rod and reel combinations include the well known bait casting and spin casting systems wherein the respective reels are mounted on top of the handle portion and positioned forward of the casting hand. The somewhat sloped handles, in combination with the positioning of the hand and wrist during the casting operation does not tend to unduly stress the wrist of the use in that the hand characteristically does not rotate the wrist much beyond the normal hand shake position.

Spinning fishing systems utilize rods that have the line guides downwardly positioned, and characteristically have handles longitudinally aligned with the rod. The handle characteristically includes a distal portion for mounting to the rod, a central portion serving as a reel mount and casting handle, and a proximal portion that in some models can be used for two-handed presentation. The so-called spinning reels can be either open faced or closed-faced, and during the bait presentation both allow line to flow freely from a stationary longitudinally positioned spool. During retrieval, a bail in open-faced systems or a pin in closed-faced systems engage the line and cause it to be wound onto the spool. During the casting operation the open-faced bail or closed-face pin are withdrawn from engagement with the line, and the line must be controlled by the casting hand of the user. Spinning reels characteristically are mounted vertically beneath the handle portion and are positioned such that the line can be controlled by a finger of the user during the presentation process while allowing the line to flow freely to the nearest line guide during the presentation when released. Since the prior art spinning systems have the reel mounting portion axially aligned with the rod mounting portion, the hand of the user and operation of the system causes the wrist to be quite severally rotated in one direction on the back stroke and causes the wrist to be reverse rotated much beyond the normal handshake position in the forward casting or presentation motion. For users having existing physical conditions such as arthritis or conditions existing from repeated stress, such as carpal tunnel syndrome, these repeated presentation actions with spinning systems can cause pain or further injury to the user. For users without preexisting conditions, the repeated use of such systems can cause fatigue and pain in the wrist and may negatively impact the normal enjoyment of fishing. It is desirable to mitigate the ergonomic deficiencies of prior art spinning equipment systems that this invention is directed.

OBJECTS

It is a primary object of this invention to provide an improved wristsaver fishing system.

It is another primary object of this invention to provide an improved ergonomic handle for use with a spinning reel and spinning rod that minimizes stress on the wrist of the user during casting operations.

Another object of the invention is to provide an ergonomic handle for use as part of a spinning rod and reel combination having a reel mount that positions the reel on the ergonomic handle in an operative position with respect to the casting hand of the user.

A further object of the invention is to provide an improved wristsaver fishing rod handle that has a first ergonomic handle portion arranged at a first angle to the longitudinal axis of an associated pole mounting portion, together with a second handle portion mounted at a second angle to the ergonomic handle portion, whereby the primary casting hand of a user can grasp the ergonomic handle portion without causing undue stress to the wrist of the user during the casting operations and the secondary hand of the user can grasp the second handle portion during two-handed casting operations.

A further object of the invention is to provide an improved wristsaver fishing rod handle wherein an ergonomic handle portion can be adjusted with respect to it's alignment with a mounting portion of the handle to thereby allow the handle to be adjusted to match a preferred gripping angle for the individual user.

Still another object of this invention is to provide an improved fishing rod handle that allows adjustment of the angle of the ergonomic handle portion and reel mount with respect to the axial alignment of an associated pole portion, together with a second adjustment mechanism to allow adjustment of a second angle of a butt handle portion with respect to the ergonomic handle and reel mount portion, to thereby allow the user to adjust portions of the improved fishing rod handle to accommodate the user's physical characteristics and allow the most comfortable hand positions during casting operations.

These and other more detailed and specific objectives will become clear from a consideration of the Drawings in conjunction with the Summary of Invention, together with the Detailed Description of Preferred Embodiments.

SUMMARY OF THE INVENTION

The present invention is directed to an improved wristsaver fishing rod handle for use as part of a spinning rod fishing system which places the primary casting hand of a user in an ergonomically correct position during the operation of casting. To accomplish this improved functionality, the improved fishing rod handle includes a mounting structure for coupling to an elongated pole portion, an ergonomic handle coupled to the mounting portion at a predetermined angle to thereby minimize undesirable ergonomic stress on the wrist of the user during casting operations, and a reel mount structure for coupling a spinning reel to the ergonomic handle portion to position an associated spinning reel in operative proximity to the primary casting hand of the user to allow control and release of line during the casting operations. With the positioning of the ergonomic handle portion at an angle to the mounting portion, the wrist of the casting hand of the user is not required to be repeatedly rotated first in one direction with respect to the forearm during the back cast and then rotated in the opposite direction with respect to the forearm in the casting or bait presentation action.

As a further improvement of the improved wristsaver fishing rod handle, there is provided a butt handle portion that is mounted at a second predetermined angle to the ergonomic handle portion to thereby provide a second holding portion for various fishing operations, including two-handed casting. With the butt handle portion at a second angle, the second hand of the user is placed in a position that is comfortable and ergonomically appropriate to minimize stress in the second hand of the user as well as the primary casting hand. With this configuration, the improved spinning rod and reel system can be either ergonomically supported by a primary casting hand with minimized stress on the wrist of the user, while controlling the line and casting, or can be used in a two-handed casting operation with the hands of the user in comfortable and nonstressed positions with respect to the fishing rod handle and with respect to each other.

In a preferred configuration, the invention of the wristsaver fishing rod handle includes mounting means for mounting the improved handle to become part of a fishing rod, first handle means mounted at a first predetermined angle to the mounting means, reel mount means coupled to the first handle means for mounting an associated spinning reel in juxtaposition to the casting hand of a user in an operative relationship that allows control of the line, and second handle means mounted at a second predetermined angle with respect to the first handle means. Another embodiment includes a first adjustable means for adjusting the first predetermined angle. Yet another embodiment includes a second adjustable means for adjusting the second predetermined angle. A further embodiments includes a third adjustable means for adjusting the second handle means to a position out of alignment with the first handle means.

Another aspect of the invention comprises an improved fishing system that includes a rod portion with a plurality of downwardly extending line guides spaced apart along it's length, a handle portion having a mounting portion to mount to the rod, a first handle portion coupled to the mounting portion at a first predetermined angle, a second handle portion coupled at a second predetermined angle to the first handle portion, and a reel mount coupled to the first handle portion for mounting a spinning reel in juxtaposition to the hand of the user to allow control of the line during casting operations. Other embodiments of the improved fishing system include a first adjustable structure for allowing adjustment of the first predetermined angle, a second adjustable structure for allowing adjustment of the second adjustable angle, and third adjustable structure for adjusting the alignment of the second handle portion with respect to the first handle portion.

The above-discussed and other features and advantages of the present invention will be appreciated and understood by those skilled in the art from the following Description of the Drawings and the Description of the Preferred Embodiment.

DESCRIPTION OF THE PREFERRED EMBODIMENT

In the following description, to the extent possible for clear description, elements that appear in differing figures will bear the same reference numeral.

Figure 1:
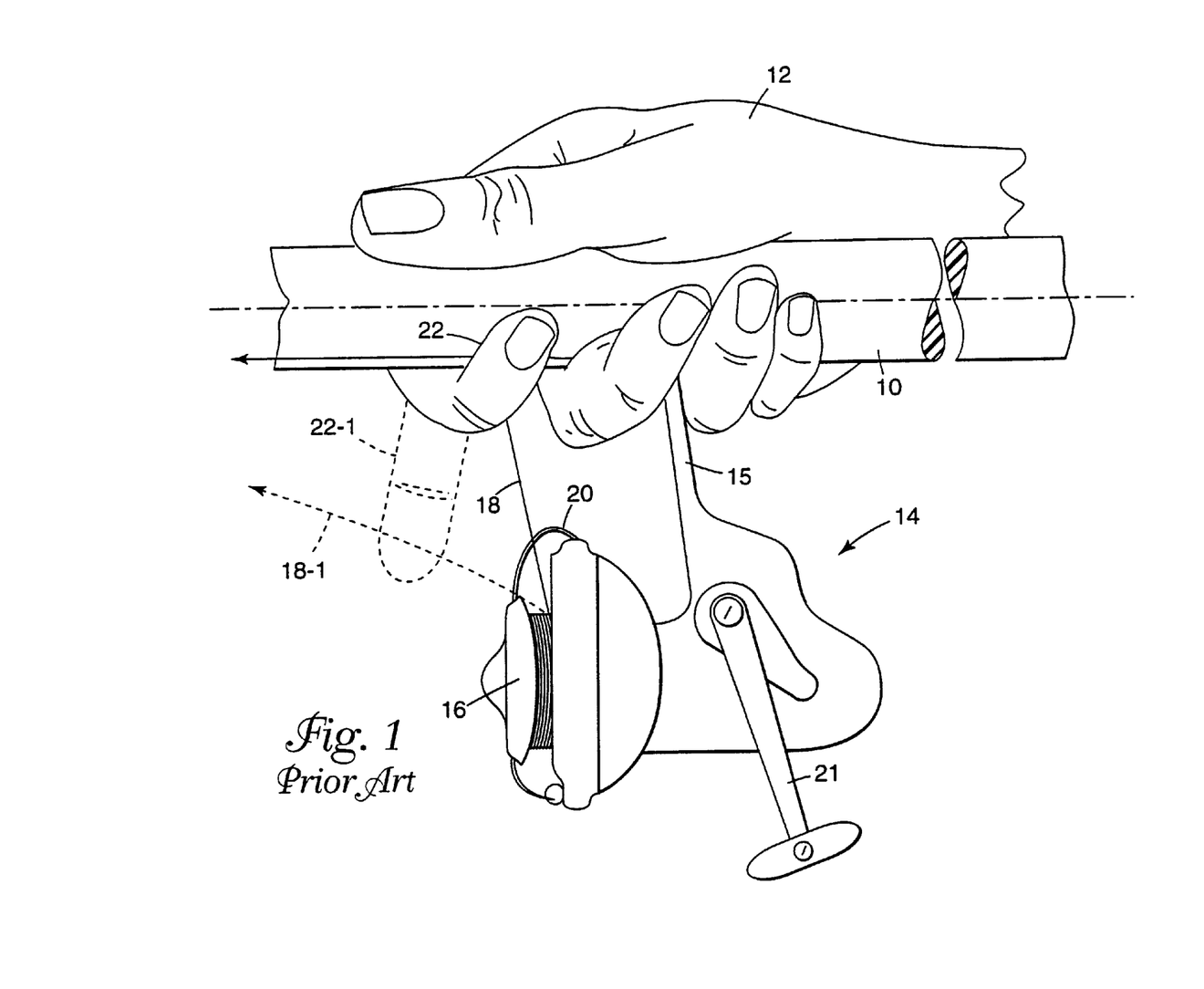
FIG. 1 is a partial pictorial side view of a Prior Art spinning reel and fishing rod handle configuration.

FIG. 1 is a partial pictorial side view of Prior Art spinning reel and fishing rod handle configuration. A handle 10 is gripped by the primary casting hand 12. A spinning reel 14 is coupled to handle 10 with a leg 16 downwardly extending from handle 10 with a mounting structure (not shown) coupled to handle 10. The coupling structure is well known, and allows reel 14 to be removably mounted to handle 10. Reel 14 includes a longitudinal spool 16 on which line 18 is wound. A line pickup device, or bail, 20 engages line 18 during a retrieval process activated by rotation of handle 22. When in the casting position and mode, bail 20 is retracted from engagement of line 18 as shown, and the line is controlled by the forefinger 22 by pressing it against the surface of handle 10. During the casting operation line 18 is thus controlled, and on the forward casting or bait presentation action, forefinger 22 releases line 18 as shown by dashed forefinger 22-1 allowing a line 18-1 to be stripped off from spool 16.

Figure 2:
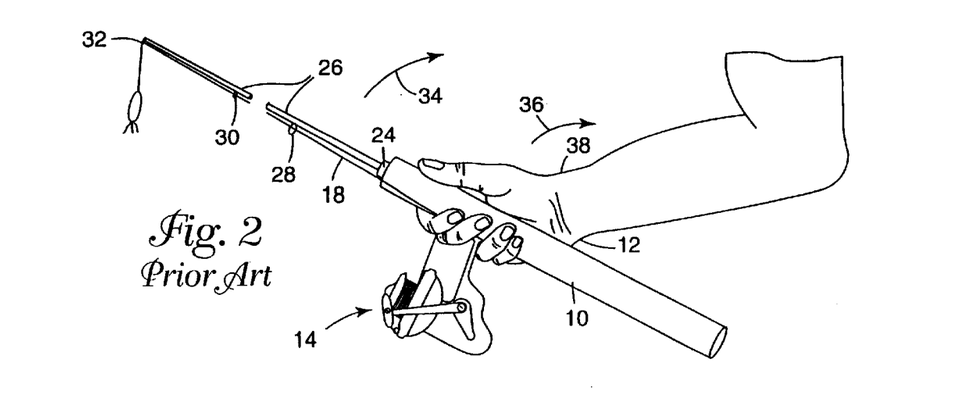
FIG. 2 is a side view of a Prior Art spinning reel and rod handle as the casting action starts and illustrates the start of rotating the wrist.
Figure 3:
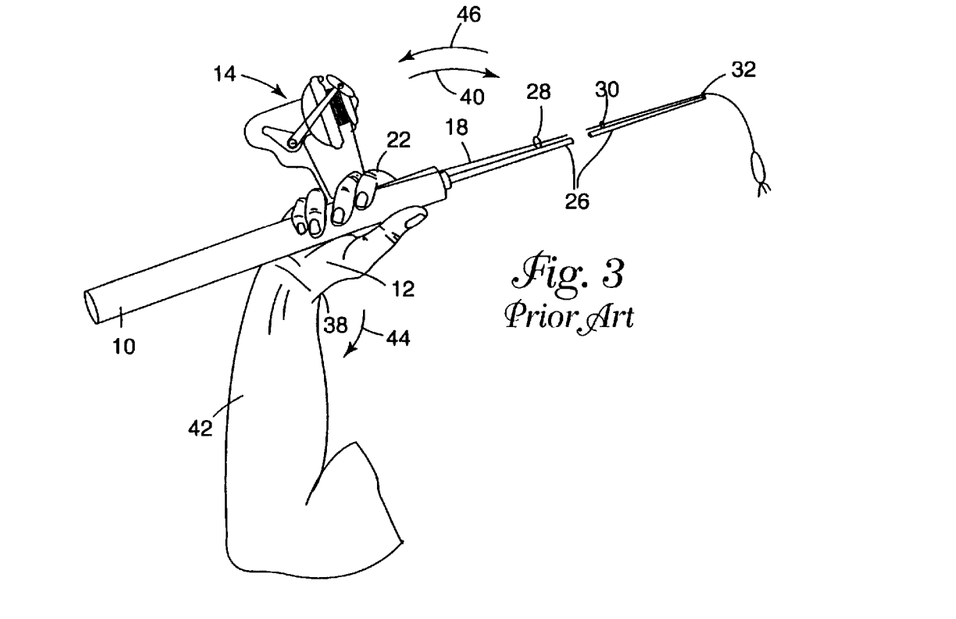
FIG. 3 is a side view of the Prior Art spinning reel and rod handle of FIG. 2, with the rod handle positioned to start the forward casting operation, and illustrates the forearm raised and the wrist rotated.
Figure 4:
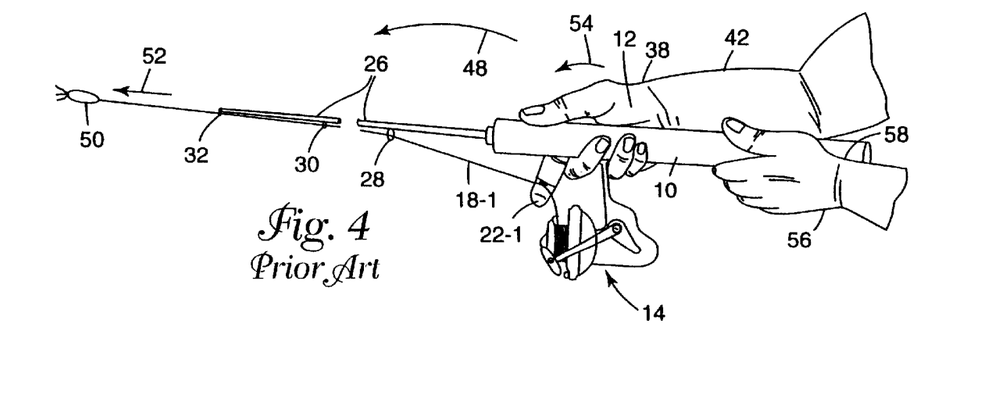
FIG. 4 is a side view of the Prior Art spinning reel and rod handle of FIG. 2 with the rod handle extended and the line release at the end of the casting operation and illustrates the forearm extended and the wrist counter rotated, and further illustrates how both hands can be used to grip the rod handle to perform the cast.

The Prior Art casting actions are shown in FIG. 2, FIG. 3, and FIG. 4.

FIG. 2 is a side view of a Prior Art spinning reel and rod handle as the casting action starts and illustrates the start of rotating the wrist as illustrated, elongated handle 10 has a mounting portion 24 coupled to the proximal end of the foreshortened rod or pole portion 26. Rod 26 has a number of downwardly extending line guides 28 and 30 with a distal tip line guide 32. Rod 14 is mounted as described in FIG. 1, and as the casting action starts by movement of the spinning reel and fishing rod assembly in the direction of arrow 34, the hand 12 is moved in the direction of arrow 36 with respect to wrist 38. At this time line 18 is controlled as described above.

FIG. 3 is a side view of the Prior Art spinning reel and rod handle of FIG. 2, with the rod handle position to start the forward casting operation, illustrates the forearm raised and the wrist rotated. In this configuration, line 18 is controlled by finger 22 as previously described, and handle 10 and rod portion 26 have been moved the maximum back cast distance in the of arrow 40. When thus positioned, the users wrist 38 is most severely flexed to the maximum with respect to forearm 42 as indicated by arrow 44. As shown, hand and forearm 42 are raised and wrist 38 is cocked or rotated to start the forward casting motion indicated by arrow 46.

FIG. 4 is a side view of the Prior Art spinning reel and rod handle of FIG. 2 with the rod handle extended and line release at the end of the casting operation and illustrates the forearm extended and the wrist counter rotated, and further illustrates how both hands can be used to grip the rod handle to perform the cast. As rod 26 and handle 10 are accelerated in the direction of arrow 48, finger 22-1 releases line 18-1 and allows the lure 50 in combination with the action of rod 26 to cause line to be move outwardly in the direction of arrow 52. During this forward casting motion, wrist 38 is caused to be counter rotated in the direction of arrow 54 beyond the normal handshake position of hand 12 with respect to forearm 42. This action causes ergonomic stress to wrist 38. When handle 10 is long enough, the other hand 56 of the user can hold the butt end of the handle 10 for two-handed casting operations. As shown, the Prior Art spinning reel and fishing rod handle configuration has the longitudinal axis of the handle 10 longitudinally aligned with the axis of rod or pole portion 26. It is this Prior Art longitudinal alignment that causes the excessive rotation of hand 12 about wrist 38 with respect to forearm 42 in a first direction during back cast, and in a second counter rotation in the forward casting or bait presentation action. As shown, wrist 58 is also caused to be excessively rotated when handle 10 is straight.

Figures 5, 6, 7A, 7B:
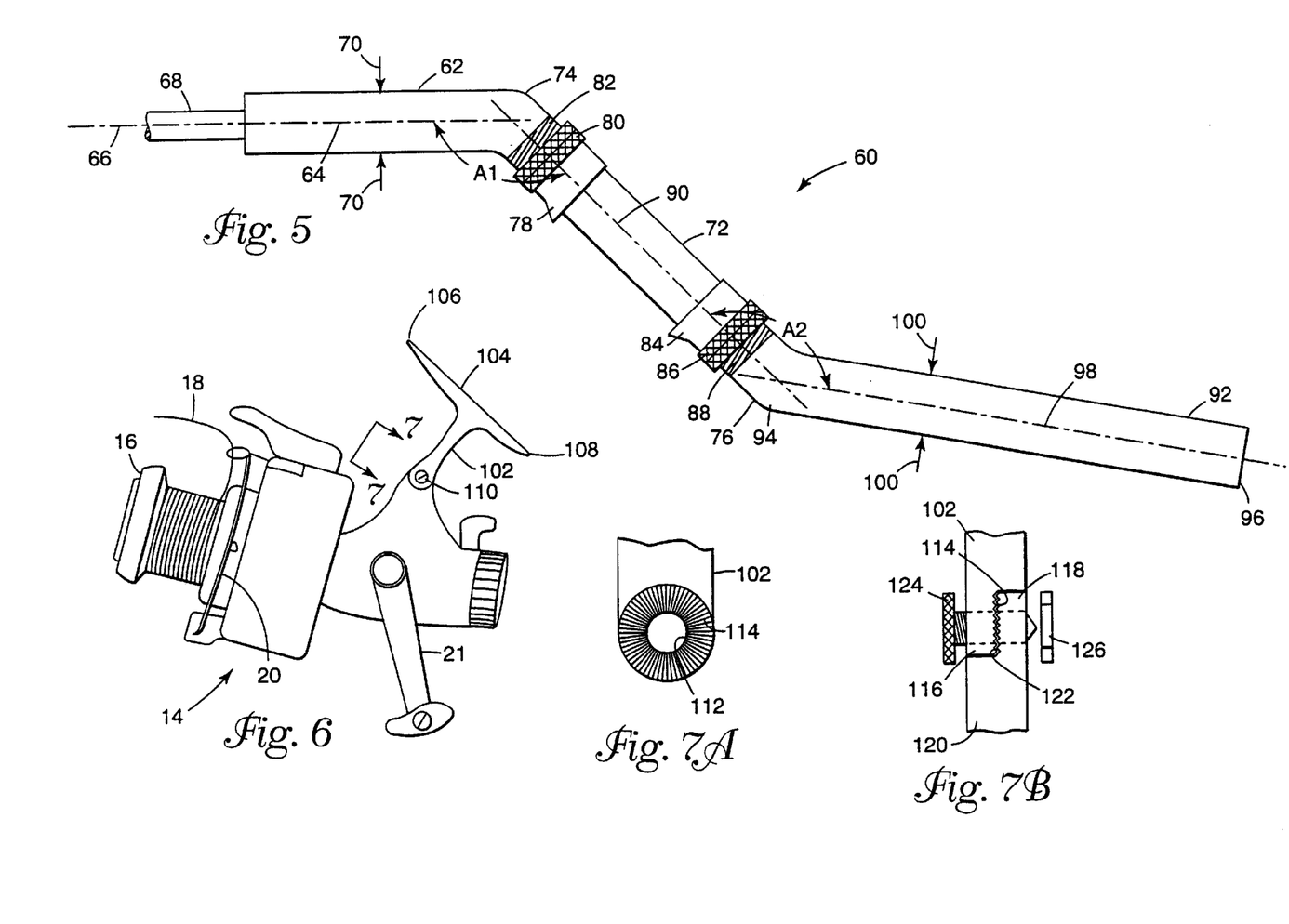
FIG. 5 is a side view of the improved wristsaver fishing rod handle of the present invention.
FIG. 6 is a side view a spinning reel having its mounting structure adapted to conform with the wristsaver fishing rod handle, and further illustrates an improved mechanism to provide an adjustable mount structure.
FIG. 7A is a partial face view of an adjustable reel mounting element shown at line 7—7 in FIG. 6.
FIG. 7B is a front end view of an adjustable reel mounting element shown at line 7—7 in FIG. 6.

FIG. 5 is a side view of the improved wristsaver fishing rod handle of the present invention. The wristsaver fishing rod handle 60 includes a mounting structure 62 having a longitudinal axis 64 longitudinally aligned with longitudinal axis 66 of the mounting portion 68 of pole 26. The cross-sectional diameter shown by arrows 70 will be adjusted according to the weight of the total fishing system, and may range from a diameter of about ½ inch to greater than 1 inch. Similarly, the length of the mounting portion 62 will vary depending upon the overall design of the system, but must be long enough to form a substantial engagement with the proximal end of rod 68 to allow the user to feel the action of rod.

The ergonomic handle portion 72 is coupled at one end 74 to mounting portion 62, and has an opposite end 76. A reel mounting structure utilizes a first adjustable gripper 78 that can be moved along the length of handle portion 72 by nut 80 traversing a threaded portion 82. A second gripping portion 84 can be moved along the length by nut 86 engaging threaded portion 88. Gripping portions 78 and 84 each engage associated portions of a mounting structure on a reel, as will be described in more detail below. The ergonomic handle portion 72 is arranged with it's longitudinal axis 90 at an inside angle A1 with respect to longitudinal axis 64. In the preferred embodiment, angle A1 is nominally 136 degrees. This angle A1 can be in the range between about 125 degrees and about 160 degrees while maintaining appropriate ergonomic relationship of the hand of the user with respect to the longitudinal axis 64 of the handle 60. A second or butt handle portion 92 has a distal end 94 coupled to end 76 of the handle portion 72, and has a proximal or butt end 96. The longitudinal axis 98 is positioned at a predetermined angle A2 with respect to the longitudinal axis 90 of the ergonomic handle 72. Angle A2 is an inside angle, and in the preferred embodiment is nominally about 148 degrees. It is understood that Angle A2 can be selected within a range of about 125 degrees to as much as about 180 degrees. In the preferred arrangement, angle A2 is preferred to be greater than angle A1 for most users, and to minimize wrist flexing in both hands of the user. As described with respect to the mounting portion 62, the diameter shown by arrows 100 will vary depending upon the overall structure of the handle and rod system. For ultra-light spinning systems, the handle 92 could have a diameter of about ¾ inch, and for heavier system may have a diameter in excess of 1 inch. While diameters of the handle elements are shown to be uniform, it is of course understood that they may vary with respect to each other and may be shaped as desired for comfort of use. Overall length will vary by design, but in the preferred embodiment, handle portion 92 should be no less than about 8 inches in length. Structural materials will be selected from materials and coverings known and commonly used in the prior art.

FIG. 6 is a side view of a spinning reel having it's mounting structure adapted to conform with the wristsaver fishing rod handle, and further illustrates an improved mechanism to provide an adjustable mount structure. As shown, spinning reel 14 whose mount structure includes a curved downwardly extending leg 102 coupled to a mount member 104 positioned at a angle to allow engagement of ends 106 and 108 with gripping members 78 and 84, respectively. The curve to downwardly extending leg 102 is selected to accommodate angle A1 to thereby allow line 18 to appropriate flow toward the first one of the plurality of spaced apart line guides. This arrangement of the curvature and length of downwardly extending leg 102 is such that reel 14 is in juxtaposition to the hand of the user when mounted, such that line 18 can be gripped by the hand of the user for control during the casting operation. As shown, bail 20 has engaged line 18 and is shown in the reel-in position.

A modification of leg 102 can be made to include an adjustment mechanism 110 that allows adjustment of the angle of mounting structure 104 with the position of spool 16, and as will be described below, can accommodate variability of selection of angle A1.

FIG. 7A is a partial face view of an adjustable reel mount element shown line 7—7 in FIG. 6. As shown, leg 102 is fashioned with an aperture 112 and has a plurality of teeth 114 arranged around aperture 112. Aperture 112 can be threaded to receive a locking bolt, or can be smooth if a nut and bolt locking actuator is utilized.

FIG. 7B is a front-end view of an adjustable reel mounting element shown at line 7—7 in FIG. 6. As shown, leg 102 has it's lower end 116 mating with an upper end 118 of the reel connection element 120. Elements 102 and 120 have mating tooth structures 114 and 122, respectively, that allow the angle of reel 14 to be adjusted with respect to the mounting structure 104. A bolt 124 is arranged to engage nut 126 for holding mating portions 114 and 122 in appropriate selected position. It is of course understood that if the aperture through elements 102 and 120 are threaded, that a mating screw could replace the bolt 124 and nut combination 126, and that other arrangements for allowing elements 102 and 120 to be held in selectable position to adjust the angle of reel 14 could be used.

Figure 8:
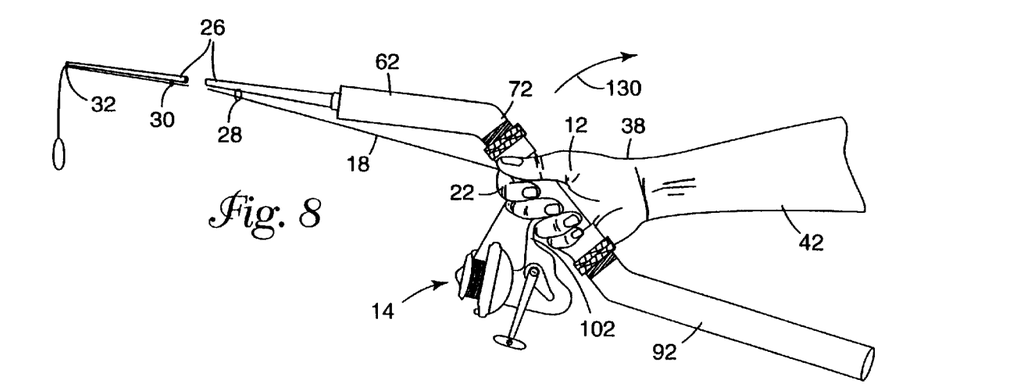
FIG. 8 is a side view of spinning reel and wristsaver rod handle showing the wrist unrotated when the casting motion starts.

FIG. 8 is a side view of a spinning reel and wristsaver rod handle showing the wrist unrotated when the casting motion starts. As shown, reel 14 has leg 102 curved to position reel 14 on handle 72 in juxtaposition to hand 12 such that wrist 38 is substantially in the handshake position while allowing line 18 to be gripped by forefinger 22. As described relative to the prior art, an elongated pole portion 26 is shown having a plurality of spaced apart downwardly extending line guides 28 and 30, with distal tip line guide 32. With wrist 38 in a relaxed position with primary casting hand 12 grasping the handle portion 72, forearm 42 can raise the entire improved fishing system in the direction of arrow 130 without causing wrist 38 to be rotated.

Figure 9:
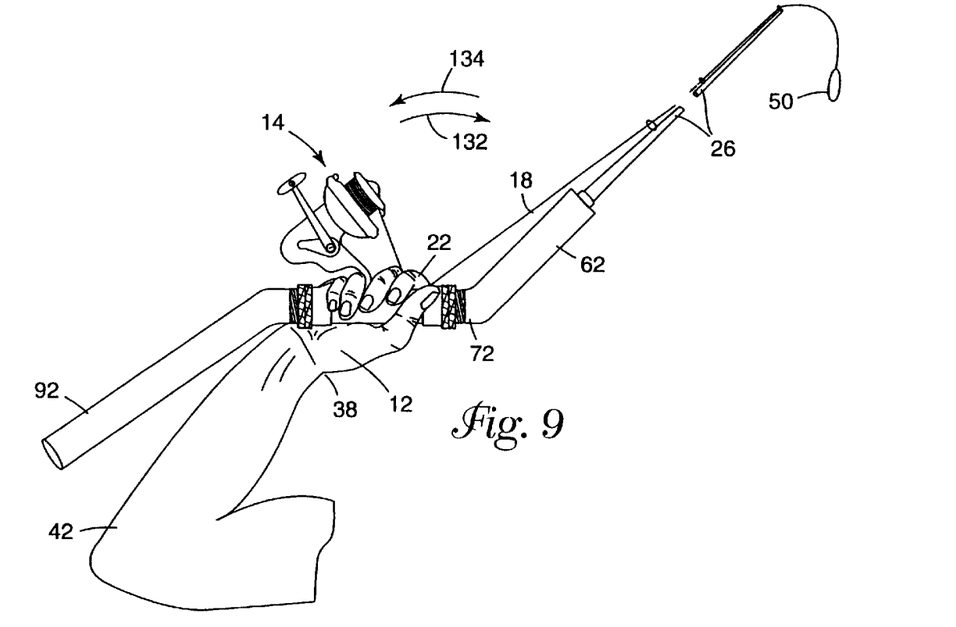
FIG. 9 is a side view of a reel and wristsaver rod handle of FIG. 8, with the rod positioned to start the forward casting motion, and illustrates the forearm raised and the wrist remaining unrotated.

FIG. 9 is a side view of a reel and wristsaver rod handle of FIG. 8 with the rod position to start the forward casting motion and illustrates the forearm raised and wrist remaining unrotated. With wrist 38 remaining substantially in the handshake position and substantially unrotated, forearm 42 is raised in the direction of arrow 132 to the maximum back cast position. As thus positioned, lure 50 is cast back and the action is ready to start the forward casting or bait delivery motion. The casting action results when forearm 42 reverses the direction of the improved fishing system and causes it to move in the direction of arrow 134, while still maintaining control of line 18 by forefinger 22.

Figure 10:
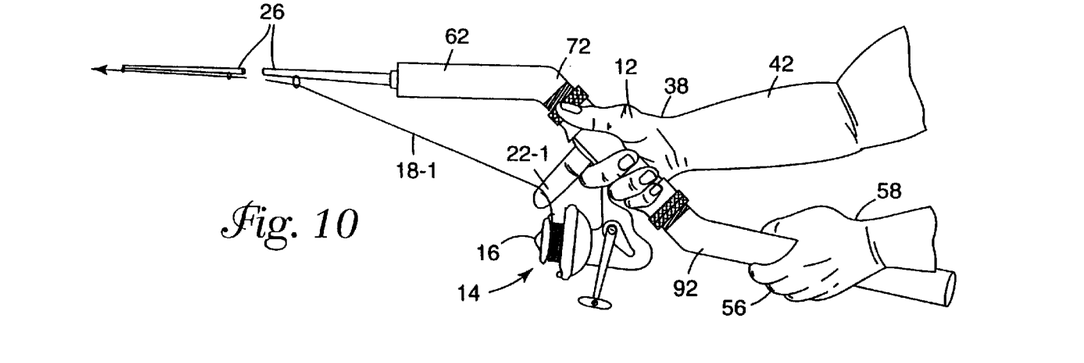
FIG. 10 is a side view of a reel and wristsaver rod handle of FIG. 8, with the wristsaver rod handle extended and the line released at the end of the casting operation, and illustrates the forearm extended with the wrist remaining substantially unrotated, and further illustrates how both hands can be used to grip the wristsaver rod handle to perform the cast.

FIG. 10 is a side view of a reel and wristsaver rod handle of FIG. 8, with the wristsaver rod handle extended and the line released at the end of the casting operation, and illustrates the forearm extended with the wrist remaining substantially unrotated. It further illustrates how both hands can be used to grip the wristsaver rod handle to perform the cast. As rod 26 is moved to the bait release position, forefinger 22-1 releases line 18-1 such that it can flow freely from spool 16. Again, wrist 38 remains substantially unrotated and hand 12 in substantially the handshake position with respect to forearm 42. For two-handed casting, handle portion 92 can be gripped by the other hand 56 of the user with it's wrist 58 also being subjected to minimal flex or rotation.

It can be seen, then, that the various stated purposes and objectives of the invention have been accomplished relative to fixed relationship of the ergonomic handle 72 at a first predetermined angle with respect to the mounting member 62, and at a second predetermined angle with respect to handle portion 92.

Figures 11, 12, 13, 14:
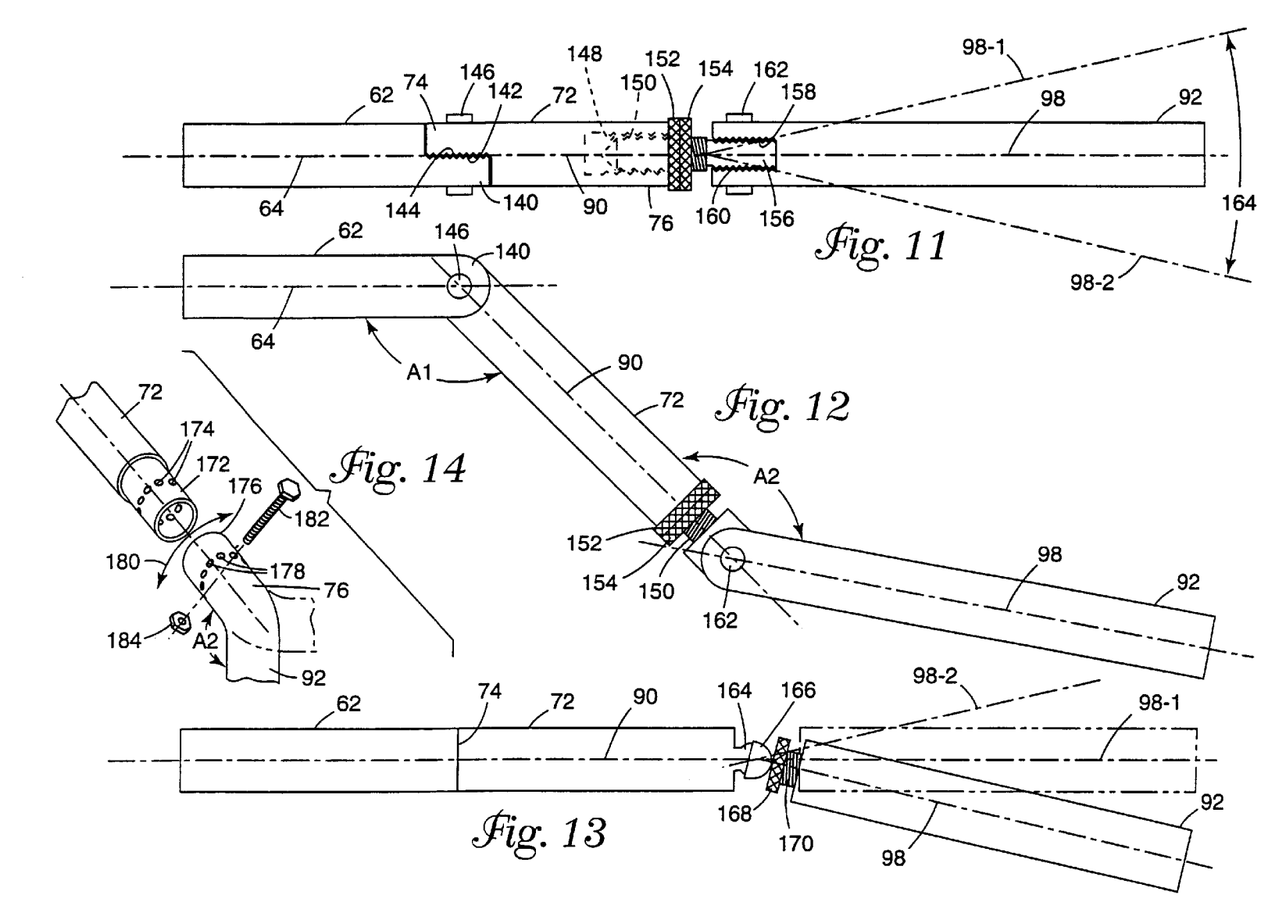
FIG. 11 is a top view of another embodiment of the wristsaver rod handle of this invention and illustrates two adjustable mechanisms for adjusting related portions of the wristsaver rod handle in a plane and another adjustable mechanism for adjusting a portion of the wristsaver rod handle out of the plane.
FIG. 12 is a side view of the embodiment shown in FIG. 11, and illustrates the adjustable relationships of the reel mount and gripping portion with respect to the distal rod mount portion and the proximal handle portion and further illustrates the adjustability of the proximal handle portion out the plane of the reel mount and gripping portion.
FIG. 13 is a top view of yet another embodiment of the wristsaver rod handle and illustrates an adjustable proximal handle portion that can be laterally adjusted out of alignment with the axis of the distal rod mount portion.
FIG. 14 is an exploded perspective view of an alternative coupling mechanism for allowing lateral adjustment of the axis of the proximal handle portion with respect to the reel mount and gripping portion.

FIG. 11 is a top view another embodiment of the wristsaver rod handle of this invention and illustrates two adjustable mechanisms for adjusting related portions of the wristsaver rod handle in a plane and another adjustable mechanism for adjusting a portion of the wristsaver rod handle out of a plane. In this embodiment toothed adjusting mechanisms such as described in FIGS. 7A and 7B can be utilized. A mounting member 62 has a mating end 140 that mates with end 74 of first handle 72. The first adjustable mechanism includes mating teeth 142 and 144 together with tightening bolt 146. This allows adjustment of angle A1 in a manner described with respect to FIG. 7A and FIG. 7B. The opposite end 76 of handle portion 72 is fitted with a longitudinal aperture 148 along longitudinal axis 90 with aperture 148 tapped to receive mating screw member 150 that can be locked in place by a pair of locking nuts 152 and 154. Bolt 150 has an end 156 with opposite toothed faces 158 and 160 each having a plurality of spaced apart teeth for engaging with mating portions of handle 92. The second locking mechanism includes bolt 162, the toothed elements of handle 92 and mating toothed element 156. This second adjusting structure allows adjustment of angle A2 of handle 92 with respect to handle 72 along it's longitudinal axis 98. With handle 92 at an angle with respect to handle 72, rotation of bolt 150 will allow adjustment of the longitudinal axis of handle portion 92 to be swung out of the plane as shown by arrow 164 such that it can be adjusted with its longitudinal axis in the range of 98-1 for left handed casting and in the range of longitudinal axis 98-2 for right handed casting.

FIG. 12 is a side view of the embodiment shown in FIG. 11 and illustrates the adjustable relationships of the reel mount and gripping portion with respect to the distal rod mount portion and the proximal handle portion and further illustrates the adjustability of the proximal handle portion out of the plane of the reel mount and gripping portion. As shown, mounting portion 62 is coupled at bolt 146 such that angle A1 can be adjusted within a range as indicated above, namely, within the range of about 125 degrees and about 160 degrees. Similarly, casting handle portion 90 can have it's angle of adjustment adjusted with regard to handle portion 92 and locked in place bolt 162 to thereby allow adjustment of angle A2 as described above. This range of adjustment for angle A2 can be in the range of about 125 degrees to about 180 degrees. The adjustment of the butt handle portion 92 out of alignment with the ergonomic portion 72 is as described in FIG. 11. It is of course understood that various other configurations can be used for allowing adjustment of angles A1 and A2.

FIG. 13 is a top view of yet another embodiment of the wristsaver rod handle and illustrates an adjustable proximal handle portion that can be laterally adjusted out of alignment with the axis of the distal rod mount portion. As shown, mounting portion 62 is integrally formed with handle portion 72, but it should be understood that junction 74 could be made adjustable as described in FIG. 11. The junction of handle portion 72 and 92 has an alternative adjusting mechanism that is comprised of a ball member 164 formed at the proximal end on handle 72. Ball 164 is matingly engaged by split member 166 that is normally biased open. To close split member 166, an engaging nut 168 is capable of being moved along threaded portion 170. When nut 168 moves along threaded portion 170 to engage split member 166, it urges it into fixed contact with ball 164 and causes handle 92 to be fixedly attached with relationship to handle 90 in the selected position. In the position illustrated, butt handle 92 has it's longitudinal axis out of the plane of handle 90 and mounting member 62, and at an angle A2 that may be selected. When butt handle 92 has it's longitudinal axis 98 in the position of axis 98-1, it is adjusted in the plane with handle 90, and it's vertical adjustment would be made in a manner similar to that described in FIG. 12. Further, butt handle 92 can be moved to be out of the plane in the opposite direction as indicated by longitudinal axis 98-2.

FIG. 14 is an exploded perspective view of an alternative coupling mechanism for allowing lateral adjustment of the axis of proximal handle portion with respect to the reel mount and gripping portion. In this configuration reel mount and gripping portion 72 has a cylindrical member 172 with a plurality of apertures 174 around it's periphery. The end portion 76 of the proximal handle portion 92 has a cylindrical portion 176 adjusted to mate with cylindrical portion 172. It also has a plurality of apertures 178 around it's circumference, arranged in a configuration capable of alignment with various associated ones of apertures 174. Handle portion 92 can moved clockwise or counterclockwise as indicated by arrow 180 to position the proximal handle 92 in the plane desired. When appropriately positioned, bolt 182 can be passed through two pairs of mating apertures 178 and 174, and held in place by nut 184 being engaged. In this manner, handle 92 having a predetermined fixed angle A2 can be moved in and out of the plane with respect to handle 72.

It can be seen that the various stated purposes and objectives have been satisfied by description of the foregoing preferred embodiments of invention. An improved ergonomic fishing pole handle has been described that will minimize the adverse ergonomic impact on the wrist of a user during repeated casting operations. Further, adjustment devices have been described to allow adjustment of the operative angles of the ergonomic handle and the butt handle with respect to the longitudinal axis of the pole portion and with respect to each other.

Having described the preferred embodiments of the invention in conjunction with drawings, it can be seen that various stated purposes and objectives have been achieved, and it is submitted that various modifications and extension will be apparent to those skilled in the art within the spirit and scope of the invention. Accordingly, what is intended to be protected by Letters Patent is set forth in appended Claims.

I claim:

1. For use with a fishing rod, an improved wristsaver fishing rod handle comprising:

a mounting structure for coupling to the fishing rod;

a handle mounted to said mounting structure at a first non-aligning downwardly extending predetermined angle, said handle for being gripped by a hand of a user during a casting operation without causing said hand and the wrist of said user to be flexed with respect to the forearm of said user; said handle having an underside; and a reel mount affixed to said underside of said handle for mounting a reel in an operative relationship to said hand of said user, whereby said wrist of said user is subjected to minimal repeated stresses.

2. For use as part of a fishing rod by a user supporting it with a primary casting hand and wrist, the fishing rod including an elongated pole portion having a distal tip and a proximal end, an improved wristsaver fishing rod handle comprising:

mounting means for coupling to the proximal end of the elongated pole portion;

ergonomic handle means coupled in non-alignment with said mounting means for positioning the primary casting hand of a user in an ergonomically acceptable position to minimize undesirable ergonomic stress on the wrist of the user during casting operations; said ergonomic handles means including a gripping means for being gripped by the primary casting hand; and reel mount means for coupling a reel to said gripping means of said ergonomic handle means in juxtaposed operative proximity to the primary casting hand of the user for ease of control during casting.

3. An improved wristsaver fishing rod handle as in claim 2, and further including:

butt handle means coupled at an angle to said ergonomic handle means for grasping by the user during two-handed casting operations.

4. An improved wristsaver fishing rod handle as in claim 3, and further including a first adjustable means for adjusting said first predetermined angle.

5. For use with a fishing rod, an improved wristsaver fishing rod handle comprising:

mounting means for coupling to the fishing rod;

first handle means mounted to said mounting means at a first non-aligning predetermined angle, said first handle means for being gripped by a hand of a user during a casting operation without causing said hand and the wrist of said user to be flexed with respect to the forearm of said user;

reel mount means mounted on said first handle means for mounting a reel in an operative relationship to said hand of said user during said casting operation; and second handle means mounted at a second predetermined angle to said first handle means for providing a second holding portion for various fishing operations, whereby said wrist of said user is subjected to minimal repeated stresses during repeated ones of said casting operation.

6. An improved wristsaver fishing rod handle as in claim 5, wherein said first predetermined angle is the inside angle between said mounting means and said first handle means and is in the range between about 125° and about 160° with respect to said mounting means.

7. An improved wristsaver fishing rod handle as in claim 5, wherein said second predetermined angle is the inside angle between said first handle means and said second handle means and is in the range between about 125° and about 180° with respect to said first handle means.

8. An improved wristsaver fishing rod handle as in claim 7, and further including a second adjustable means for adjusting said second predetermined angle.

9. An improved wristsaver fishing rod handle as in claim 8, and further including a third adjustable means for adjusting said second handle means to a selected position out of axial alignment with said first handle means.

10. For use by a user supporting it with a primary casting hand and wrist, as part of a fishing rod having an elongated pole portion with a plurality of line guides coupled thereto in a predetermined spaced-apart configuration, the elongated pole portion having a distal tip and proximal end, and an improved wristsaver fishing rod handle comprising:

a mounting structure having a first longitudinal axis and having a coupling end to longitudinally couple to the proximal end of the elongated pole portion, and said mounting structure having a handle end portion;

a first handle having a first predetermined length, a second longitudinal axis, a first end portion coupled to said to handle end portion with said second longitudinal axis at a first non-aligned predetermined angle with respect to the said first longitudinal axis, and a second end portion;

a second handle having a second predetermined length, a third longitudinal axis, a third end portion coupled to said second end portion of said first handle with said third longitudinal axis at a second predetermined angle with respect to said second longitudinal axis, and having a proximal butt end; and a reel mount mounted on said first handle;

whereby the primary casting hand and wrist of the user is positioned in an acceptable ergonomic relationship to the first handle to minimize stress on the wrist of the user during repeated casting operations.

11. An improved wristsaver fishing rod handle as in claim 10, wherein said second predetermined angle is greater than said first predetermined angle.

12. An improved wristsaver fishing rod handle as in claim 11, wherein said first predetermined angle is about 136° and said second predetermined angle is about 148°.

13. An improved wristsaver fishing rod handle as in claim 10, wherein said first predetermined angle is an inside angle between said first longitudinal axis and said second longitudinal axis and is in a first range greater than about 125 degrees.

14. An improved wristsaver fishing rod handle as in claim 13, wherein said first range is between about 125 degrees and about 160 degrees.

15. An improved wristsaver fishing rod handle as in claim 14, and further including a first adjustable structure coupled intermediate said handle end and said first end portion to allow adjustment of said first range.

16. An improved wristsaver fishing rod handle as in claim 10, wherein said second predetermined angle is an inside angle between said second longitudinal axis and said third longitudinal axis and is an second range greater than about 125 degrees.

17. An improved wristsaver fishing rod handle as in claim 16, wherein said second range is between about 125 degrees and about 180 degrees.

18. An improved wristsaver fishing rod handle as in claim 17, and further including a second adjustable structure coupled intermediate said second end portion and said third end portion to allow adjustment of said second range.

19. An improved wristsaver fishing rod handle as in claim 18, and further including a third adjustable structure coupled to said second adjustable structure to allow adjustment of said third longitudinal axis out of longitudinal alignment with said second longitudinal axis, whereby said second handle can be offset to assist in two-handed casting operations.

20. An improved wristsaver fishing rod handle as in claim 10, wherein said reel mount includes first and second adjustable structures to engage the mounting structure of a spinning reel.

21. An improved fishing system comprising:

a rod portion having a first predetermined length, a distal tip, a proximal end, and plurality of downwardly extending line guides spaced apart along said first predetermined length of said rod portion;

a handle portion including,
a mounting portion having a first longitudinal axis, and having a coupling end longitudinally coupled to said proximal end of said rod portion and having a handle end portion;

a first handle portion having a second predetermined length, a second longitudinal axis, a first end portion coupled to said handle end portion with said second longitudinal axis at a first predetermined angle non-aligned with respect to said first longitudinal axis, and having a second end;

a second handle portion having a third predetermined length, a third longitudinal axis, a third end portion coupled to said second end portion of said first handle portion, with said third longitudinal axis at a second predetermined angle non-aligned with respect to said second longitudinal axis, and having a proximal butt end;

a reel mount coupled to said first handle portion;

a spinning reel having line wound thereon, and having a mount structure removably engaged by said reel mount to affix said spinning reel to said first handle portion, said mount structure including a downwardly extending leg member, said leg member having a predetermined reel alignment angle to substantially align said spinning reel with said plurality of downwardly extending line guide in a position to allow a user to control said line during casting operations.

22. An improved fishing system as in claim 21, wherein said first predetermined angle is an inside angle between said first longitudinal axis and said second longitudinal axis and is in a first range greater than about 125 degrees.

23. An improved fishing system as in claim 22, wherein said first range is between about 125 degrees and about 160 degrees.

24. An improved fishing system as in claim 23, and further including a first adjustable structure coupled intermediate said handle end and said first end to allow adjustment of said first range.

25. An improved fishing system as in claim 21, wherein in said second predetermined angle is an inside angle between said second longitudinal axis and said third longitudinal axis and is in a second range greater than about 125 degrees.

26. An improved fishing system as in claim 25, wherein said second range is between about 125 degrees and about 180 degrees.

27. An improved fishing system as in claim 26, and further including a second adjustable structure coupled intermediate said second end and said third end to allow adjustment of said second range.

28. An improved fishing system as in claim 27, and further including a third adjustable structure coupled to said second adjustable structure to allow alignment of said third longitudinal axis out of longitudinal alignment with second longitudinal axis, whereby second handle portion can be offset to assist in two-handed casting operations.

29. An improved fishing system as in claim 21, wherein said reel mount includes first and second adjustable structures to engage said mount structure.

* * * * *